United States Patent [19]

Bealkowski et al.

[11] Patent Number: 5,586,327
[45] Date of Patent: Dec. 17, 1996

[54] EXTENDED INITIALIZATION FOR PERSONAL DATA PROCESSING SYSTEMS

[75] Inventors: Richard Bealkowski, Austin, Tex.; John W. Blackledge, Boca Raton, Fla.; Michael R. Turner, Austin, Tex.

[73] Assignee: International Business Machines Corporation, Austin, Tex.

[21] Appl. No.: 313,481

[22] Filed: Sep. 27, 1994

[51] Int. Cl.⁶ .................................. G06F 9/00
[52] U.S. Cl. ................................. 395/652
[58] Field of Search .................... 395/700, 650

[56] References Cited

U.S. PATENT DOCUMENTS

| | | | |
|---|---|---|---|
| 4,430,704 | 2/1984 | Page et al. | 364/200 |
| 4,491,914 | 1/1985 | Sujaksu | 364/200 |
| 4,590,557 | 5/1986 | Lillie | 364/200 |
| 4,633,466 | 12/1986 | Laws et al. | 371/16 |
| 4,663,707 | 5/1987 | Dawson | 364/200 |
| 4,720,812 | 1/1988 | Kao et al. | 364/900 |
| 4,787,034 | 11/1988 | Szoke | 364/300 |
| 4,803,623 | 2/1989 | Klashka et al. | 364/200 |
| 4,833,594 | 5/1989 | Familetti et al. | 364/200 |
| 4,858,114 | 8/1989 | Heath et al. | 364/200 |
| 4,979,106 | 12/1990 | Schneider | 364/200 |
| 5,008,814 | 4/1991 | Mathur | 364/200 |
| 5,210,875 | 5/1993 | Bealkowski et al. | 395/700 |
| 5,230,052 | 7/1993 | Dayan et al. | 395/700 |
| 5,410,699 | 4/1995 | Bealkowski et al. | 395/700 |
| 5,410,707 | 4/1995 | Bell | 395/700 |
| 5,418,918 | 5/1995 | Vander Kamp et al. | 395/375 |

Primary Examiner—Kevin A. Kriess
Attorney, Agent, or Firm—Geoffrey Mantooth; Michael Buchenhorner

[57] ABSTRACT

A method and apparatus for extending initialization of a personal data processing system using multiple levels of bootstrap code is provided. The first level of bootstrap code is stored in a non-volatile memory device associated with a processor of the data processing system. The second level of code is stored on a system partition or other section of a fixed disk memory storage device. The second level of bootstrap code is user configurable, and also provides access to a file system. A first initialization procedure is performed by executing the first level of bootstrap code, where the first initialization procedure performs a memory check self-test of the data processing system and conditions the data processing system for a program load. The second level of bootstrap code is then executed performing a second initialization procedure which performs specific initialization steps according to the configuration of the second level of bootstrap code. A file system containing any required test and initialization code may be accessed by the second initialization procedure. After initialization is complete, the initial program load of an operating system is executed.

13 Claims, 4 Drawing Sheets

EXTENDED INITIALIZATION FOR PERSONAL DATA PROCESSING SYSTEMS

TECHNICAL FIELD OF THE INVENTION

The present invention relates to methods and apparatuses for testing and initializing a personal data processing system upon startup of the personal data processing system.

BACKGROUND OF THE INVENTION

Personal data processing systems in general and IBM personal computers in particular have attained widespread use for providing computer power to many segments of today's modern society. Personal data processing systems can usually be defined as a desk top, floor standing, or portable microcomputer that consists of a system unit having a system processor or processors and associated volatile and non-volatile memory, a display monitor, a keyboard, one or more diskette drives, a fixed disk storage, and an optional printer. One of the distinguishing characteristics of these systems is the use of a motherboard or system planar to connect these components together. These systems are designed primarily to give independent computing power to a single user and are inexpensively priced for purchase by individuals or small businesses. Examples of such personal data processing systems are IBM's PERSONAL COMPUTER AT and IBM's PERSONAL SYSTEM/2 Models 25, 30, L40SX, 50, 55, 65, 70, 80, 90 and 95. (PERSONAL SYSTEM/2 and IBM are trademarks of International Business Machines Corporation.)

Personal data processing systems utilize memory in the form of Random Access Memory (RAM) as a relatively inexpensive and fast storage device for use in conjunction with central processing unit operations. During the operation of a data processing system, an operating system program is loaded into the RAM. The operating system manages the components or subsystems of the computer, processes commands, and controls programs. In addition to the operating system, the RAM contains data and application programs that have been loaded during the operation of the computer. When electrical power to the computer is switched off, the contents of the RAM vanishes.

Personal data processing systems typically include a memory device such as Read Only Memory (ROM) on which "bootstrap" information is stored. The bootstrap information commonly includes data for conducting an internal test of the data processing system and for initially configuring the data processing system and its many subsystems such as the RAM, hard and floppy disk drives, and video adapters. The bootstrap information also includes code for loading operating systems software, such as OS/2, into the system from a device or subsystem (such as a hard disk drive). (OS/2 is a trademark of International Business Machines Corporation.) Furthermore, the bootstrap information may include code for configuring the subsystems. This bootstrap information is stored in non-volatile memory so that the data is retained in the memory device when power is removed from the data processing system. When power is applied to the data processing system, the bootstrap information is automatically loaded into the processing parts of the data processing system.

In operation, upon startup, the data processing system loads the bootstrap information. The bootstrap information instructs the data processing system to perform a power-on self test ("POST") to make sure that the various subsystems are working properly. The bootstrap information also instructs the data processing system to configure itself and any peripheral units coupled to the data processing system, thereby initializing the data processing system. Finally, the bootstrap information instructs the data processing system to load operating system software into the RAM in an Initial Program Load (IPL) sequence. The loaded operating system enables the data processing system to run other software applications.

Typically, when ROM is used as a source of bootstrap information, the bootstrap information is unalterably fixed into the ROM during manufacture. One type of prior art data processing system relies on the ROM as the exclusive source of the bootstrap information. However, data processing systems may have applications or peripheral devices that require additional or modified bootstrap information. These applications or peripheral devices have generally required the data processing system to first bootstrap itself using the unalterable bootstrap information in ROM. Then, the configuring data or other parameters are changed with software routines available after the operating system has been loaded into the data processing system. This is a cumbersome and inflexible process.

Other prior art data processing systems have allowed a minor amount of flexibility in the loading of bootstrap information by providing a second nonvolatile memory device upon which bootstrap information may be written and erased. The second memory device, which is alterable, works in combination with the unalterable memory device to provide the bootstrap information necessary to initialize the data processing system for use. The unalterable memory device provides the initial bootstrap information, which provides sufficient information to enable the data processing system to read a second level of user configurable bootstrap information from the second memory device. Typically the unalterable memory device is a ROM device and the second memory device is an Erasable Programmable Read Only Memory (EPROM) device. However, the flexibility of using dual ROM memory sources is limited because only a relatively limited amount of user configurable code may be written on the second memory device. In addition, an EPROM device is alterable only with difficulty. The EPROM device must first be exposed to ultraviolet light to erase or clear the memory. Then, the new information is loaded in.

Another prior art method (referred to as the INIT program method) also allows some flexibility in manipulation of the bootstrap information by driving a very small portion of a disk storage device with the information from the unalterable bootstrap memory device. A very small, perhaps one or two sectors (512 bytes per sector) worth of information, are stored on track zero of the fixed disk. This is the same track that typically contains the boot record for the disk. The bootstrap information contained in the ROM or the EPROM directs the data processing system to read one or two disk sectors of the disk storage device. The disk sectors contain additional bootstrap information that may be configured by a data processing system user. However, the bootstrap information that is stored in these disk sectors cannot be protected from being overwritten. Furthermore, no access is provided to a file system because an operating system has not been loaded.

One problem with the prior art initialization schemes is that the amount of nonvolatile storage available for the bootstrap information is limited. The test and initialization processes required to bootstrap a data processing system are ever increasing in size and complexity. It is becoming prohibitive to include all the required test and initialization code in the ROM memory devices typically used to store bootstrap information, or in the limited disk space accessible to the data processing system prior to IPL. For example, high function adapters (such as video adapters) for interfacing peripherals with the data processing system may contain microprocessors having a large memory requiring a large, loadable code base that must be loaded from the bootstrap information in order to configure the adapter and the peripheral. The test and initialization processes must be completed before the IPL loads the operating system into the data processing system because the operating system relies on the subsystems having been tested and initialized prior to the IPL.

Another problem with prior art initialization schemes is that the software that performs the initialization on the extended high function subsystems requires access to a file subsystem on a storage device. Access to a file system is required in order to retrieve the data and control files necessary for the initialization. However, access to a file system is not provided before an operating system has been loaded onto the data processing system.

Therefore, what is desired is a dynamically extendible initialization and POST mechanism which allows for flexible and independent activities to be performed before the IPL phase, and which has access to a file system so as to be able to retrieve data and control files necessary to completely test and initialize the data processing system and its subsystems.

SUMMARY OF THE INVENTION

It is an object of the present invention to provide a method and apparatus for initializing a data processing system that may be easily configured and that provides access to a file system so that flexible and independent initialization activities may be performed before the initial program load.

A first set of instructions is provided on a non-volatile memory device, and a configurable second set of instructions is provided on a partition of a memory storage device. In order to initialize the data processing system, the first set of instructions is loaded into the processor of the data processing system from the non-volatile memory device. The processor executes the first set of instructions. After execution of the first initialization procedure, the second set of instructions is addressed and executed to perform a second initialization procedure. The second initialization procedure further initializes the data processing system in accordance with the configuration of the second set of instructions. After addressing and executing the second set of instructions, the processor completes execution of the first set of instructions by performing an IPL (initial program load), thereby preparing the data processing system for further operations.

The second set of instructions may be configured by a user of the data processing system to accomplish specific initialization steps. The second set of instructions provides access to a file system, which provides ample storage for any required test and initialization code and allows flexible and independent activities to be performed before the IPL phases.

The present invention allows the initialization procedure to be extended in a flexible and convenient manner. The first phase of the initialization (referred to as resident POST) is executed by the conventional BIOS program located in ROM or other non-volatile memory. The resident POST is limited to 128K of memory, due to constraints on the size of the ROM. However, this first inititialization phase can be extended into a second initialization phase, the code for which is located in a system partition on the fixed disk. After the second phase (or extended) initialization has been completed, normal system IPL can begin in order to load the operatng system.

The present invention provides additional space for initialization, which space is limited only by the size and space of the system partition on the fixed disk. The initialization code in the system partition can access a file system, an operating system, and BIOS calls so as to provide initialization of high function adapters. Thus, the extended initialization is provided access to a suboperating system. Also, the initialization code in the system partition can be easily changed. The system partition can contain message files, wherein support for various human languages can be provided.

BRIEF DESCRIPTION OF THE DRAWINGS

Some of the objects of the invention having been stated, other objects will appear as the description proceeds, when taken in connection with the accompanying drawings, in which.

DESCRIPTION OF THE INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
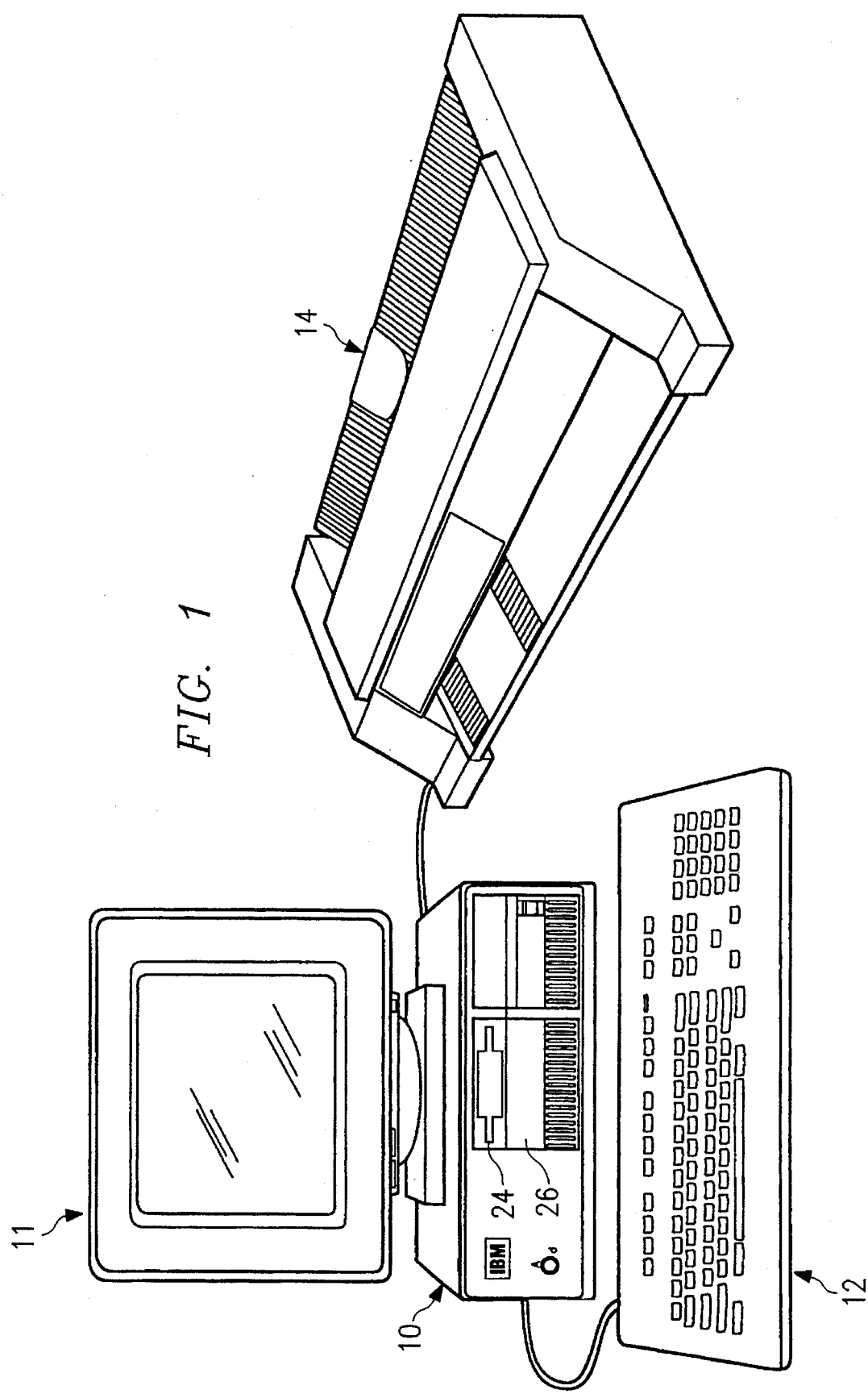
FIG. 1 is a perspective view of a personal computer embodying this invention.
Figure 2:
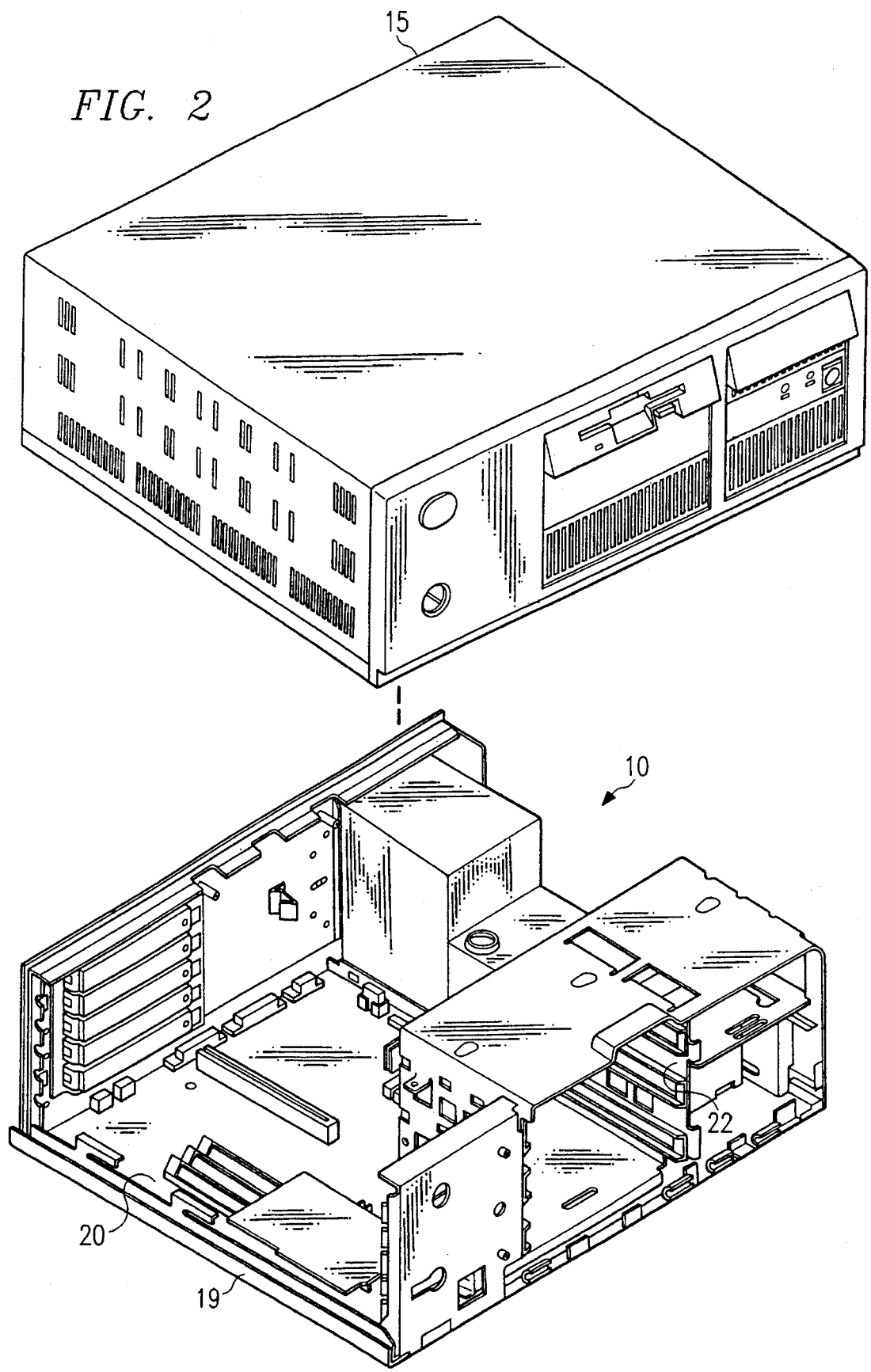
FIG. 2 is an exploded perspective view of certain elements of the personal computer of FIG. 1 including a chassis, a cover, and a planar board and illustrating certain relationships among those elements.

Referring now more particularly to the accompanying drawings, a microcomputer embodying the present invention is there shown and generally indicated at 10 (FIG. 1). As mentioned hereinabove, the computer 10 may have an associated monitor 11, keyboard 12 and printer or plotter 14. As shown in FIG. 2, the computer 10 has a cover 15 which cooperates with a chassis 19 in defining an enclosed, shielded volume for receiving electrically powered data processing and storage components or subsystems for processing and storing digital data. At least certain of these components are mounted on a multilayer planar 20 or motherboard which is mounted on the chassis 19 and provides a means for electrically interconnecting the components of the computer 10 including those identified above and such other associated elements such as floppy disk drives, various forms of direct access storage devices, accessory cards or boards, and the like. Referring to FIG. 1, there is shown a floppy disk drive 24 and a hard or fixed disk drive 26.

The chassis 19 has a base and a rear panel (see FIG. 2) and defines at least one open bay for receiving a data storage device such as a disk drive for magnetic or optical disks, a tape backup drive, or the like. In the illustrated form, an upper bay 22 is adapted to receive peripheral drives of a first size (such as those known as 3.5 inch drives). A floppy disk drive 24 (see FIG. 1), a removable media direct access storage device which is capable of receiving a diskette inserted thereinto and using the diskette to receive, store and deliver data as is generally known, may be provided in the upper bay 22 of FIG. 2.

Figure 3:
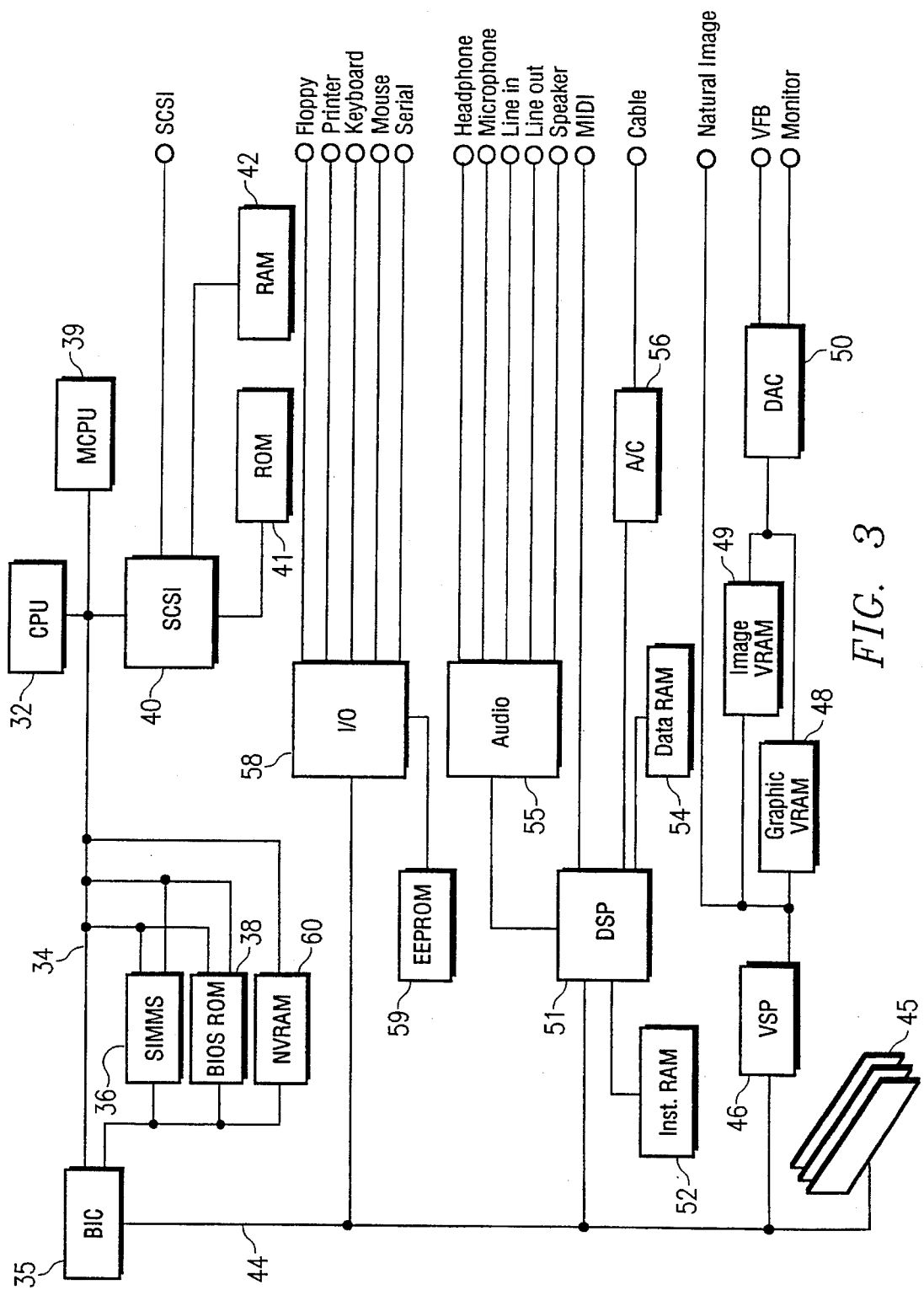
FIG. 3 is a block diagram of certain components of the personal computer of FIGS. 1 and 2.

A summary of the operation in general of the personal computer system 10 may also merit review. Referring to FIG. 3, there is shown a block diagram of a personal computer system illustrating the various components of the computer system such as the system 10 in accordance with the present invention, including components mounted on the planar and the connection of the planar to the Input/Output (I/O) slots and other hardware of the personal computer system. Connected to the planar is the Central Processing Unit (CPU) 32. While any appropriate microprocessor can be used as the CPU 32, one suitable microprocessor is the 80386 which is sold by INTEL. The CPU 32 is connected by a high speed CPU local bus 34 to a Bus Interface Control unit (BIC) 35, to volatile Dynamic Random Access Memory (DRAM) 36 here shown as Single Inline Memory Modules (SIMMs) and to BIOS ROM 38 in which is stored instructions for Basic Input/Output System (BIOS) operations to the CPU 32. The BIOS ROM 38 includes either ROM, EPROM, or both, The BIOS ROM 38 includes the BIOS that is used to interface between the I/O devices and the operating system of the CPU 32. In addition, the BIOS is used to provide POST and initialization operations during the bootstrapping of the data processing system. The BIOS is also used to initiate the IPL, wherein an operating system is loaded from a source (such as a fixed disk) into RAM. Instructions stored in ROM 38 can be copied into RAM 36 to decrease the execution time of the BIOS. In addition, there is provided non-volatile RAM (NVRAM) 60 which contains information that is retained during power off periods of the data processing system.

While the present invention is described hereinafter with particular reference to the system block diagram of FIG. 3, it is to be understood at the outset of the description which follows that it is contemplated that the apparatus and methods in accordance with the present invention may be used with other hardware configurations. For example, the system processor could be an INTEL 80486 microprocessor.

Returning now to FIG. 3, the CPU local bus 34 (comprising data, address and control components) also provides for the connection of the CPU 32 with a numeric or math coprocessor (MCPU) 39 and a Small Computer Systems Interface (SCSI) controller 40. The SCSI controller 40 may, as is known to persons skilled in the arts of computer design and operation, be connected or connectable with ROM 41, RAM 42, and suitable external devices of a variety of types (such as a fixed disk) as facilitated by the I/O connection indicated to the right of the Figure. The SCSI controller 40 functions as a storage controller in controlling storage memory devices such as fixed or removable media electromagnetic storage devices (also known as hard and floppy disk drives), electro-optical, tape and other storage devices.

The bus interface controller (BIC) 35 couples the CPU local bus 34 with an I/O bus 44 and functions as a protocol translator, memory controller and DMA controller among other functions. By means of the I/O bus 44, the BIC 35 is coupled with an optional feature bus such as a MICRO CHANNEL bus having a plurality of I/O slots for receiving MICRO CHANNEL adapter cards 45 which may be further connected to an I/O device or memory (not shown). The I/O bus 44 includes address, data, and control components. The I/O bus 44 may be configured to bus specifications other than the MICRO CHANNEL specification.

Coupled along the I/O bus 44 are a variety of I/O subsystems such as a Video Signal Processor (VSP) 46 which is associated with Video RAM (VRAM) for storing character based information (indicated at 48) and for storing image based information (indicated at 49). Video signals exchanged with the processor 46 may be passed through a Digital-to-Analog Converter (DAC) 50 to a monitor or other display device. Provision is also made for connecting the VSP 46 directly with what is here referred to as a natural image input/output, which may take the form of a video recorder/player, camera, etc. The I/O bus 44 is also coupled with a Digital Signal Processor (DSP) 51 which has associated instruction RAM 52 and data RAM 54 available to store software instructions for the processing of signals by the DSP 51 and data involved in such processing. The DSP 51 provides for processing of audio inputs and outputs by the provision of an audio controller 55, and for handling of other signals by provision of an analog interface controller 56. Also, the I/O bus 44 is coupled with an input/output controller 58 with associated Electrically Erasable Programmable Read Only Memory (EEPROM) 59 by which inputs and outputs are exchanged with conventional peripherals including floppy disk drives, a printer or plotter 14 (see FIG. 1), keyboard 12, a mouse or pointing device (not shown), and a serial port.

Before turning in greater detail to a description of extending initialization of a personal data processing system 10, it is appropriate to first consider the provision by a personal data processing system of a system partition. Disks used in fixed memory devices (also known as hard disk drives) may be partitioned into separate dedicated areas of disk space. Each partitioned area of the disk may be formatted and logically structured to meet whatever the needs are of the processor accessing the partition. One type of partition is a system partition, which is conventional. A system partition is a dedicated area of fixed disk space used to store data and code relating to system operations of the data processing system. In this regard, the system partition stores an image which corresponds to a system reference diskette program (diagnostics). This image includes the initial BIOS load program (from ROM). The system partition is based on a simple DOS FAT (File Allocation Table) file system. The system partition is stored at the very end of the fixed disk (the opposite end from track zero). A variety of hardware and software mechanisms hide and protect the system partition from being inadvertently written to once the operating system is loaded. Newer personal data processing systems support the presence of a system partition.

The extended initialization method of the current invention utilizes the system partition to perform further initialization procedures after a conventional power-on self test and initialization (POST) procedure resident in the data processing system tests and initializes the data processing system, but before a conventional Initial Program Load (IPL) operation is executed. The system partition enables the extended initialization method to have access to a file system, an operating system (or suboperating system), and BIOS calls before the operating system activated by the IPL is available. The access to a file system provided by the extended initialization method greatly increases the amount of initialization code that is available to be executed by the data processing system, as well as increases the flexibility of initialization procedures. The program code of the extended initialization program may also be easily changed and updated by altering the code on the system partition.

Thus, with the present invention, the system partition contains information in addition to the image of the system reference diskette program. This additional information includes test and initialization code that is specific to whatever subsystem is to be initialized with an extended initialization. For example, a video adapter subsystem may have the following components, all of which are tested and initialized by the extended initialization code: a VSP 46, Image RAM 49, Graphic RAM 48, and an Analog-To-Digital Converter 56 (see FIG. 3). The system partition contains additional information, such as files and code bases, which may be required to boot higher function adapters.

Figure 4:
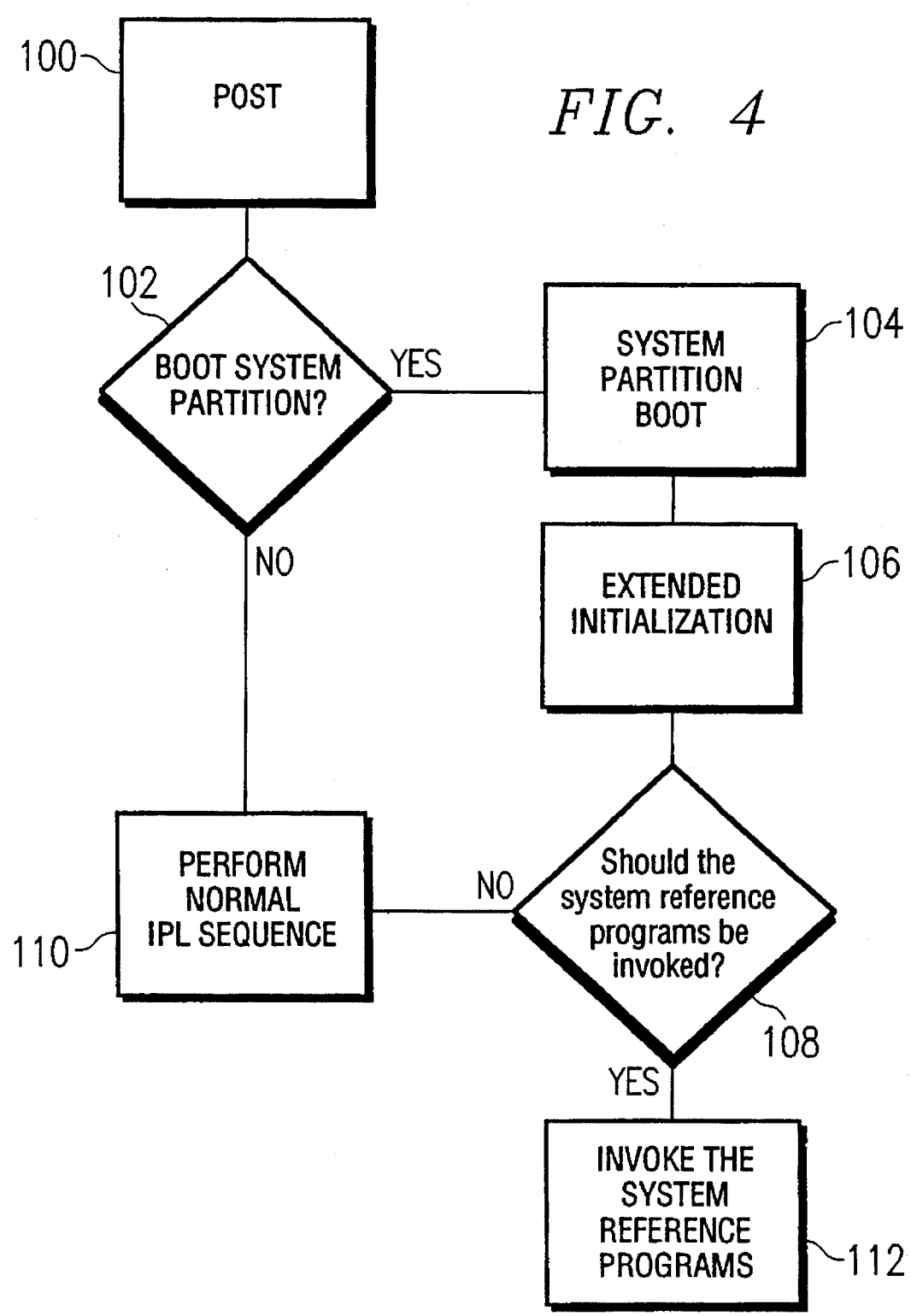
FIG. 4 is a flow chart showing the method of the present invention in accordance with a preferred embodiment.

Referring now to FIG. 4, the flow chart of the present invention will be described. In the flow chart, the following graphical conventions are used: a rectangle is used to illustrate a process or a function and a diamond is used to illustrate a decision. These conventions are well understood by programmers skilled in the art of data processing systems and the flow chart is sufficient to enable a programmer skilled in the art to write code in any suitable computer programming language such as assembly language.

The method shown in FIG. 4 is contained within the BIOS ROM 38 (see FIG. 3) and on the system partition of the fixed disk 26 (see FIG. 1) and is executed by the CPU. Initialization of the data processing system begins when the data processing system is powered-on or manually reset. The power-on or reset condition causes a signal to be sent to the CPU 32. The CPU 32 responds to the signal by accessing a predetermined location in the BIOS ROM 38. The BIOS ROM 38 contains bootstrap code (or information) for executing conventional POST and IPL operations, as well as code for determining whether an extended initialization is necessary and code for transferring program control to the system partition if extended initialization is required. The code from the BIOS ROM 38 is executed by the CPU 32.

As shown in FIG. 4, the CPU 32 executes the POST, step 100, from the bootstrap code loaded from BIOS ROM 38. The POST causes the data processing system to go through checks to make sure the subsystems are working properly. For example, during one aspect of POST, the RAM is checked. The POST code resident on the BIOS ROM 38 and the operation of the data processing system during execution of the resident POST are conventional and are well known to those skilled in the art.

After executing the resident POST, the method determines if the system partition should be booted, step 102. The method may determine whether the system partition should be booted based upon a value left in the non-volatile RAM (NVRAM) 60 by a setup program. For example, a flag can be set in NVRAM 60 upon installation of a first application or subsystem requiring the use of extended initialization. The flag can be reset upon the deinstallation of the last application or subsystem that requires the use of extended initialization. In addition, an error found during execution of the resident POST will cause the CPU 32 to boot the system partition so that an operator of the data processing system may determine the cause of the error.

Typically, an application or a subsystem requires booting of the system partition if extensive test and initialization code is required to completely initialize the data processing system and its attached peripheral devices, or if the initialization performed in accordance with the resident bootstrap code is required to be modified to operate with the application or peripheral device. For example, extensive test and initialization code may be required if the adapter cards 45 (FIG. 3) are high function adapters that contain microprocessors that require a large loadable code base.

Furthermore, the system partition may be booted if messages are to be provided to the user during initialization of the data processing system. Message files may be included within the system partition. The message files may support plural languages so that messages may be displayed in a language preferred by the operator of the data processing system.

If the result of step 102 is NO, the system partition is not to be booted, then the CPU 32 performs the normal IPL sequence, step 110. The system partition is not booted unless necessary (in order to reduce the power-on time of the booting sequence). To perform the IPL sequence, conventional IPL code located in the BIOS ROM is executed by the CPU 32. The bootstrap code directs the CPU to load a boot record from an input device, such as a fixed drive storage unit, into the data processing system RAM. Control is transferred from the BIOS ROM to the boot record. The boot record then proceeds to locate the operating system, load it into RAM, and transfer program control to the operating system. After loading and executing the operating system code, the data processing system may then load further program code and perform normal operations.

If the result of step 102 is YES, the system partition is to be booted, then the system partition is booted, step 104, thereby executing a second or extended boot process. The system partition is a dedicated area of disk space on a disk used in a fixed memory device for storing data and code relating to testing and initializing the data processing system. The system partition provides a subsystem level operating system that enables the system partition to have access to a file system contained in the system partition. Typically, the subsystem level operating system will provide full operating system services to the data processing system without the interface services that are provided by the operating system ultimately installed by the IPL sequence.

The system partition is based on a simple DOS file allocation table (FAT) file system. The file system accessible by the system partition includes user configurable files. The user configurable files may be configured by the user to provide data and code required to perform extended initialization procedures.

In order to boot the system partition, step 104, the BIOS ROM locates, loads, and causes the execution of the extended initialization code in the system partition. The system partition is stored at a predetermined fixed location, typically at the very end of the fixed disk. In another embodiment, the location of the system partition is determined from a partition table stored in the boot record on the fixed disk device. The boot record is typically stored on the first sector of the fixed disk device. The boot record contains, in addition to the partition table, conventional code required for booting the operating system. Once the location of the system partition is determined, the BIOS ROM initiates the loading of the system partition and the extended initialization code contained therein.

After the extended initialization code in the system partition is booted, the method then performs the extended initialization, step 106. The code to perform the extended initialization can be invoked either through the device driver mechanism (for example, by using CONFIG.SYS) or through batch processing mechanisms (for example, by using AUTOEXEC.BAT). At this step in the initialization, the POST code has full access to the subsystem operating system and the file system of the system partition. In addition, BIOS calls may be made to the BIOS ROM of the system or to the BIOS ROM of a device.

The extended initialization procedures performed in accordance with the directions of the code are specific to the device or application requiring the extended initialization. For example, a high end adapter requiring loading of large amounts of code into memory has different initialization requirements than an application requiring specific initialization setting. The user may configure the code of the system partition and the system partition files to correspond to the extended initialization procedures required.

Once extended initialization has been completed, the method then determines if the system reference programs should be invoked, step 108. The system reference programs are invoked if an error has occurred during the initialization process. The system reference programs contain a POST error processor which determines what the error is, and displays a message to the user about the error. The system reference programs are located on a storage memory device such as a fixed or floppy disk. If the result of step 108 is YES, the system reference programs should be invoked, then the system reference programs are called, thereby invoking the system reference programs, step 112. The user may then correct the error and reinitiate POST procedures.

If the result of step 108 is NO, the system reference programs need not be invoked, then the method performs the normal IPL sequence, step 110. Performance of the normal IPL sequence proceeds as disclosed above. Upon termination of the normal IPL sequence, the data processing system is prepared for interaction with the data processing system user, and the initialization procedures are complete.

The foregoing disclosure and the showings made in the drawings are merely illustrative of the principles of this invention and are not to be interpreted in a limiting sense.

What we claimed is:

1. A method of extending an initialization of a data processing system, comprising the steps of:

providing a first set of instructions in a non-volatile memory device;

providing a configurable second set of instructions in a protected partition of a memory storage device, said partition providing a subsystem level operating system;

executing said first set of instructions to perform a first initialization procedure for initializing said data processing system;

booting, said partition so as to boot said subsystem level operating system;

addressing said second set of instructions and executing said second set of instructions to perform a second initialization procedure to further initialize said data processing system by utilizing said subsystem level operating system;

after addressing and executing said second set of instructions, performing an initial program load of an operating system.

2. The method of initializing a data processing system of claim 1, further comprising the step of before addressing said second set of instructions, determining if said second set of instructions should be addressed and if so, then executing said second set of instructions and if not, then performing said initial program load of said operating system.

3. The method of initializing a data processing system of claim 1, wherein said first initialization procedure comprises the steps of:

performing a self-test to determine whether said data processing system is operating correctly;

conditioning said data processing system for loading of programs into said data processing system.

4. The method of initializing a data processing system of claim 1, wherein said subsystem level operating system provides access to a file system having configurable files therein.

5. The method of initializing a data processing system of claim 1, wherein said second set of instructions is loaded from said memory storage device.

6. The method of initializing a data processing system of claim 1, wherein the step of providing a configurable second set of instructions in a partition of a memory storage device further comprises the step of providing said second set of instructions in a system partition on a fixed disk in a fixed media electromagnetic storage device.

7. The method of initializing a data processing system of claim 6, wherein the step of addressing said second set of instructions further comprises the step of addressing a starting address of said system partition in order to address said second set of instructions.

8. The method of initializing a data processing system of claim 6, wherein the step of addressing a second set of instructions further comprises the steps of:

retrieving a starting address of said system partition from a master boot record on said disk;

addressing said retrieved starting address of said system partition in order to address said second set of instructions.

9. An apparatus for extending an initialization of a data processing system, comprising:

means for providing a first set of instructions in a non-volatile memory device;

means for providing a configurable second set of instructions in a protected partition of a memory storage device, said partition providing a subsystem level operating system;

means for executing said first set of instructions to perform a first initialization procedure for initializing said data processing system;

means for booting said partition so as to boot said subsystem level operating system;

means for addressing said second set of instructions and executing said second set of instructions to perform a second initialization procedure to further initialize said data processing system by utilizing said subsystem level operating system;

means for performing an initial program load of an operating system, after addressing and executing said second set of instructions.

10. The apparatus for initializing a data processing system of claim 9, further comprising, means for determining if said second set of instructions should be addressed before addressing said second set of instructions and if so, then for executing said second set of instructions and if not, then for performing said initial program load of said operating system.

11. The apparatus for initializing a data processing system of claim 9, wherein the means for providing a configurable second set of instructions in a partition of a memory storage device further comprises means for providing said second set of instructions in a system partition on a fixed disk in a fixed media electromagnetic storage device.

12. The method of claim 1 wherein:

said step of executing said first set of instructions further comprises the step of executing a portion of said first set of instructions;

said step of performing an initial program load of an operating system further comprises the step of executing a remainder of said first set of instructions.

13. The apparatus of claim 9 wherein:

said means for executing said first set of instructions further comprises means for executing a portion of said first set of instructions;

said means for performing an initial program load of an operating system further comprises means for executing a remainder of said first set of instructions.

* * * * *